United States Patent [19]

Schafler

[11] Patent Number: 5,316,237
[45] Date of Patent: May 31, 1994

[54] MAGNETIC TAPE APPARATUS HAVING A COMPACT REEL-BRAKE ASSEMBLY

[75] Inventor: Winfried Schafler, Korneuburg, Austria

[73] Assignee: U.S. Philips Corporation, New York, N.Y.

[21] Appl. No.: 896,804

[22] Filed: Jun. 9, 1992

Related U.S. Application Data

[63] Continuation of Ser. No. 785,182, Oct. 31, 1991, abandoned, which is a continuation of Ser. No. 570,245, Aug. 17, 1990, abandoned.

[30] Foreign Application Priority Data

Aug. 25, 1989 [AT] Austria ..................... 2016-89

[51] Int. Cl.5 ........................ G11B 15/22; G11B 15/46
[52] U.S. Cl. ..................... 242/204; 360/96.3
[58] Field of Search ............. 242/200, 201, 204; 360/96.1, 96.3, 96.4

[56] References Cited

U.S. PATENT DOCUMENTS

| | | | |
|---|---|---|---|
| 3,834,651 | 9/1974 | Hashizume et al. | 360/96.4 |
| 3,930,268 | 12/1975 | Uemura | 242/204 |
| 3,940,792 | 2/1976 | Herleth | 360/96.3 |
| 4,426,668 | 1/1984 | Itoh | 242/204 |
| 4,452,409 | 6/1984 | Takai | 242/204 |

FOREIGN PATENT DOCUMENTS

| | | | |
|---|---|---|---|
| 2348938 | 4/1975 | Fed. Rep. of Germany | 242/204 |
| 2357976 | 2/1978 | France | 242/204 |
| 0054651 | 5/1981 | Japan | 242/204 |

*Primary Examiner*—Daniel P. Stodola
*Assistant Examiner*—John Q. Nguyen
*Attorney, Agent, or Firm*—Brian J. Wieghaus

[57] ABSTRACT

A recording and/or reproducing apparatus (1), for a record carrier (2) in tape form which extends between two rotatingly driveable hubs (4, 5), has two winding spindles (10, 11) for driving the hubs, each of the winding spindles being connected to one drive wheel (12, 13). For braking the two drive wheels (12, 13), a braking device (30) is provided which has a carrier (33) displaceable perpendicularly to a plane (34) through the axes (31, 32) of the two drive wheels (12, 13) and having two braking surfaces (39, 40) for the two drive wheels. The carrier (33) is of frame-shaped design and has two carrier portions (35, 36) passing through the plane (34) through the axes (31, 32) of the two drive wheels (12, 13), each of which carrier portions is arranged so as to run laterally along one of the two drive wheels (12, 13) outside the region between the two drive wheels (12, 13).

16 Claims, 2 Drawing Sheets

MAGNETIC TAPE APPARATUS HAVING A COMPACT REEL-BRAKE ASSEMBLY

This is a continuation of application Ser. No. 07/785,182, filed on Oct. 31, 1991, now abandoned which is a continuation of Ser. No. 07/570,245, filed on Aug. 17, 1990, now abandoned.

BACKGROUND OF THE INVENTION

The invention relates to a recording and/or reproducing apparatus for a record carrier in tape form which extends between two rotatingly driveable hubs, having two winding spindles which are provided for driving the two hubs, having two rotatingly driveable drive wheels which are connected to the two winding spindles, and having a braking device, which is provided for braking the two drive wheels and has a carrier which is displaceable essentially perpendicularly to a plane through the axes of the two drive wheels, passes through this plane and on which, at a distance from the plane in a first direction perpendicular to the plane, two braking surfaces for interacting with the two drive wheels are provided and on which, at a distance from the plane in a second direction opposite to the first direction, a displacement device for displacing the carrier engages. Such an apparatus is known, for example, from DE-AS 1,081,686.

In the known apparatus, the carrier of the braking device is essentially of beam-shaped design and arranged so as to run perpendicularly to the plane through the axes of the two drive wheels in the region between the two drive wheels. A sufficiently large space between the two drive wheels must therefore be provided in order to be able to arrange the carrier of the braking device in the region between the two drive wheels and no other apparatus components provided for the purpose of interacting with the two drive wheels, such as, for example, a drive shaft which can be brought alternatively into drive connection with the two drive wheels, can be arranged in the region between the two drive wheels.

SUMMARY OF THE INVENTION

The invention has set itself the object of avoiding the difficulties presented above and of designing an apparatus of the generic type presented at the outset in such a way that the spacing between the two drive wheels can be as small as possible and that other apparatus components provided for the purpose of interacting with the two drive wheels can be arranged in the region between the two drive wheels. For this purpose, the invention is characterized in that the carrier is of frame-shaped design and has two carrier portions passing through the plane through the axes of the two drive wheels, each of which carrier portions is arranged so as to run laterally along one of the two drive wheels outside the region between the two drive wheels. Due to the frame-shaped design of the carrier, it is advantageously achieved that the spacing between the two drive wheels can be chosen to be small and that other apparatus components provided for the purpose of interacting with the two drive wheels can be arranged in the region between the two drive wheels. As a result of the small spacing between the two drive wheels, these can have as large as possible a diameter for a predetermined axial spacing, this being advantageous as regards an achievable speed reduction which is as large as possible and as regards a torque transmissible to the drive wheels which is as large as possible.

It has proven particularly advantageous if the two carrier portions of the carrier which pass through the plane through the axes of the two drive wheels are arranged so as to run laterally along those front sides of the drive wheels which face the winding spindles. It is thereby achieved that the two carrier portions can be accommodated within the spatial zone provided anyway for the winding spindles, as seen transversely to the axial direction of the winding spindles, this being advantageous as regards as small as possible an overall height. It is thereby furthermore achieved that, as seen in the axial direction of the winding spindles, the carrier portions can lie within the surface zone occupied by the two drive wheels, this being advantageous as regards as compact a design as possible in the direction transverse to the axes of the drive wheels.

BRIEF DESCRIPTION OF THE DRAWINGS

The invention is described in greater detail below with reference to three illustrative embodiments, although there is no intention to restrict it to these.

FIG. 3 shows, in a manner similar to

FIGS. 1 and 2, a recording and reproducing apparatus in accordance with a third illustrative embodiment, in which a braking device for two drive wheels, each connected to a winding spindle, has a frame-shaped carrier which has two carrier portions which pass through the plane through the axes of the two drive wheels and are arranged so as to run along those front sides of the drive wheels which face away from the winding spindles.

DESCRIPTION OF THE PREFERRED EMBODIMENTS

Figure 1:
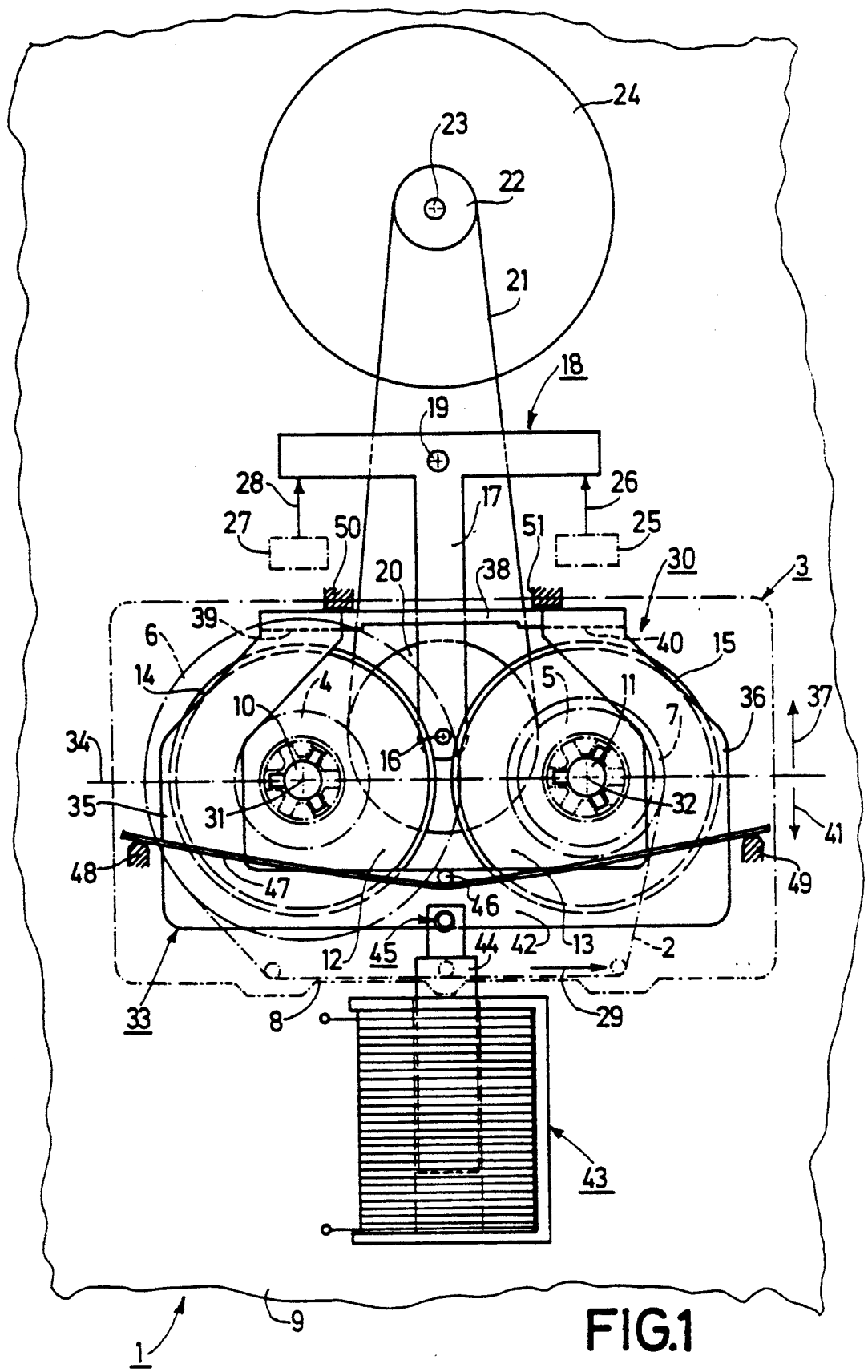
FIG. 1 shows schematically in plan view a part, essential for the invention, of a recording and reproducing apparatus in accordance with a first illustrative embodiment for a magnetic tape accommodated in a cassette, having two drive wheels each connected to a winding spindle and having a braking device for the two drive wheels, which has a frameshaped carrier which has two carrier portions which pass through the plane through the axes of the two drive wheels and are arranged so as to run along those front sides of the drive wheels which face the winding spindles.

FIG. 1 shows, schematically, part of a recording and reproducing apparatus 1 for a record carrier 2 in tape form, which is designed as a magnetic tape. The magnetic tape 2 is accommodated in a cassette 3 which can be inserted into the apparatus 1 and is represented schematically in FIG. 1 by chain lines. To accommodate the cassette, the apparatus has a trough-shaped cassette tray (not shown). In the cassette 3, the magnetic tape 2 extends between two rotatingly driveable hubs 4 and 5, which are situated next to one another, are rotatably mounted between the two principal walls of the cassette and on to which tape rolls 6 and 7 of different size in the situation represented in FIG. 1 are wound. From one to the other of the two hubs 4 and 5, the magnetic tape 2 is guided along a long narrow cassette side 8, in which openings are provided in known manner through which magnetic heads (not shown), on the apparatus, for recording and reproducing and also for erasing information signals, for example speech signals, can be brought into scanning connection with the magnetic tape 2.

For driving the two hubs 4 and 5, the apparatus 1 has two rotatingly driveable winding spindles 10 and 11, which are rotatably mounted on an essentially plate-shaped chassis 9 and, when a cassette 3 is inserted into the apparatus, move into drive connection with the two hubs 4 and 5. A drive wheel 12 and 13 respectively is connected coaxially in a manner fixed in terms of rotation to each of the two winding spindles 10 and 11. The two drive wheels 12 and 13 are designed as friction wheels and are provided on the periphery with an annular rubber covering 14 and 15.

For the purpose of driving the two friction wheels 12 and 13, the apparatus 1 has a drive shaft 16, which is arranged centrally between the two friction wheels and can be brought alternatively into nonpositive drive connection with the rubber coverings 14 and 15 of the two friction wheels 12 and 13. The drive shaft 16 is rotatably mounted at the free end of one arm 17 of a three-armed bearing bracket 18. The bearing bracket 18 is swivellably mounted on the chassis 9 by a bearing shaft 19. Coaxially connected to the drive shaft 16 in a manner fixed in terms of rotation is a pulley 20, which can be driven via an endless belt 21 by another pulley 22. The other pulley 22 is secured on the shaft 23 of a motor 24 driveable at constant rotational speed in opposite directions of rotation. Via this drive connection, the drive shaft 16 can be driven alternatively in opposite directions of rotation by the motor 24.

From the neutral central position represented in FIG. 1, in which it is held, for example, by means of a return spring (not shown), the bearing bracket 18 can be swivelled in opposite swivelling directions in order to bring the drive shaft 16 alternatively into nonpositive drive connection with one of the two friction wheels 12 and 13. By actuating a schematically indicated button 25, the bearing bracket 18 can be swivelled in the anti-clockwise direction in accordance with FIG. 1 via a displacement device indicated symbolically by an arrow 26, the drive shaft 16 then coming into nonpositive drive connection with friction wheel 13. By actuating another schematically indicated button 27, the bearing bracket 18 can be swivelled in the clockwise direction in accordance with FIG. 1 via another displacement device indicated symbolically by an arrow 28, the drive shaft 16 then coming into nonpositive drive connection with friction wheel 12.

With the drive shaft 16 pressed against friction wheel 13, the drive shaft 16 is driven at a constant rotational speed in the clockwise direction by the motor 24. Hub 5 is thereby driven in the anti-clockwise direction via friction wheel 13 and winding spindle 11 and, in the process, the magnetic tape 2 is wound on to hub 5. This corresponds to an operating mode "normal forward runing", in which the magnetic tape 2 is moved along the narrow cassette side 8 past the magnetic heads (not shown) in the direction of the arrow 29, it being possible for information signals to be recorded on the magnetic tape in a first track of the magnetic tape 2 or reproduced from the latter. With the drive shaft 16 pressed against friction wheel 12, the drive shaft 16 is driven at a constant rotational speed in the anti-clockwise direction by the motor 24. Hub 4 is thereby driven in the clockwise direction via friction wheel 12 and winding spindle 10 and, in the process, the magnetic tape 2 is wound onto hub 4. This corresponds to an operating mode "normal rewind", which is also called "reverse running", in which the magnetic tape 2 is moved along the narrow cassette side along the magnetic heads (not shown) in the opposite direction to the arrow 29, it being possible for information signals to be recorded on the magnetic tape in a second track of the magnetic tape 2 or reproduced from the latter.

In order to be able to bring the two friction wheels 12 and 13 to a standstill after driving one of the two friction wheels 12 and 13 by means of the drive shaft 16, a braking device 30 for the two friction wheels 12 and 13 is provided. The braking device 30 has a carrier 33 for two braking surfaces for the two friction wheels, said carrier being displaceable perpendicularly to the plane through the axes 31 and 32 of the two friction wheels 12 and 13 and being displaceably guided in a manner not illustrated in greater detail. The plane through the axes 31 and 32 of the two friction wheels 12 and 13 is represented in FIG. 1 by a chain line and designated by the reference numeral 34. In this arrangement the carrier 33 is advantageously of frame-shaped design and has two flat carrier portions 35 and 36 which pass through the plane 34 through the axes 31 and 32 of the two friction wheels 12 and 13 and each of which is arranged so as to run laterally along one of the two friction wheels 12 and 13 outside the region between the two friction wheels. In the present case, these two carrier portions 35 and 36 are arranged so as to run laterally along those front sides of the two friction wheels 12 and 13 which face the winding spindles 10 and 11. At a distance away from the plane 34 in a first direction indicated by an arrow 37 and perpendicular to the plane 34, the two flat carrier portions 35 and 36 are connected to one another via a likewise flat web or joining member 38, which is bent so as to run at right angles to the carrier portions 35 and 36. Two braking surfaces 39 and 40 for the two friction wheels 12 and 13 are provided on the bent web 38, said braking surfaces being formed directly by two boundary surfaces of the web 38 and being capable of being brought into operative connection with the rubber coverings 14 and 15 of the friction wheels 12 and 13. At a distance from the plane 34 in a second direction indicated by an arrow 41 and perpendicular to the plane 34, the two flat carrier portions 35 and 36 are connected to one another via a flat web, or joining member 42 lying on the same level as the carrier portions 35 and 36. A displacement device 43 for displacing the carrier 33 engages on this web 42. The displacement device 43 is formed by a solenoid plunger magnet, the solenoid plunger 44 of which is coupled to the flat web 42 of the carrier 33 via a pin-slot connection 45. There furthermore projects from the web 42 a pin 46, on which there engages a leaf spring 47, which is supported by its free ends against two stops 48 and 49 arranged fixed in the apparatus and stresses the carrier 33 in the direction of the arrow 37 and in this way presses the carrier 33 by its web 38 against two limiting stops 50 and 51 arranged fixed in the apparatus when the solenoid plunger magnet 43 is not excited.

To brake the two friction wheels 12 and 13, the solenoid plunger magnet 43 is excited, the carrier 33 thereby being displaced in the direction of the arrow 41 counter to the force of the leaf spring 47 by the solenoid plunger 44 of said magnet via the pin-slot connection 45, the braking surfaces 39 and 40 being pressed against the rubber coatings 14 and 15 of the friction wheels 12 and 13 and the friction wheels thereby being braked and brought to a standstill. When the supply of current to the solenoid plunger magnet 43 is interrupted, the latter drops out again, the leaf spring 47 then displacing the carrier 33 in the direction of the arrow 37 until the carrier 33 is supported by its web 38 against the limiting stops 50 and 51, the braking surfaces 39 and 40 of the rubber coverings 14 and 15 of the two friction wheels 12 and 13 then being lifted off and the two friction wheels 12 and 13 thereby being unbraked again.

As can be seen from FIG. 1, due to the frame-shaped design of the carrier 33 of the braking device 30 it is advantageously possible for a drive shaft 16 for driving both of the friction wheels to be arranged in the region between the two friction wheels 12 and 13 and the diameter of the two friction wheels can furthermore advantageously be chosen to be as large as possible, this being advantageous as regards as large as possible a speed reduction and as large as possible a torque transmissible from the drive shaft 16 to the friction wheels 12 and 13. By virtue of the fact that the flat carrier portions 35 and 36 and the flat web 42 of the carrier 33 are arranged to run along those front sides of the friction wheels 12 and 13 which face the winding spindles 10 and 11, these parts of the carrier 33 are accommodated, as seen transversely to the axial direction of the winding spindles 10 and 11, within the spatial zone provided anyway for the winding spindles, this being advantageous as regards as small as possible an overall height. As seen in the direction of the axes 31 and 32 of the winding spindles 10 and 11, the carrier portions 35 and 36 and the web 42 of the carrier 33 lie essentially within the surface zone occupied by the two friction wheels 12 and 13, with the result that these parts of the carrier 33 do not require any additional space in relation to the friction wheels even as seen in the direction of the axes 31 and 32, this being advantageous as regards as compact as possible a design in the direction transverse to the axes of the friction wheels.

Figure 2:
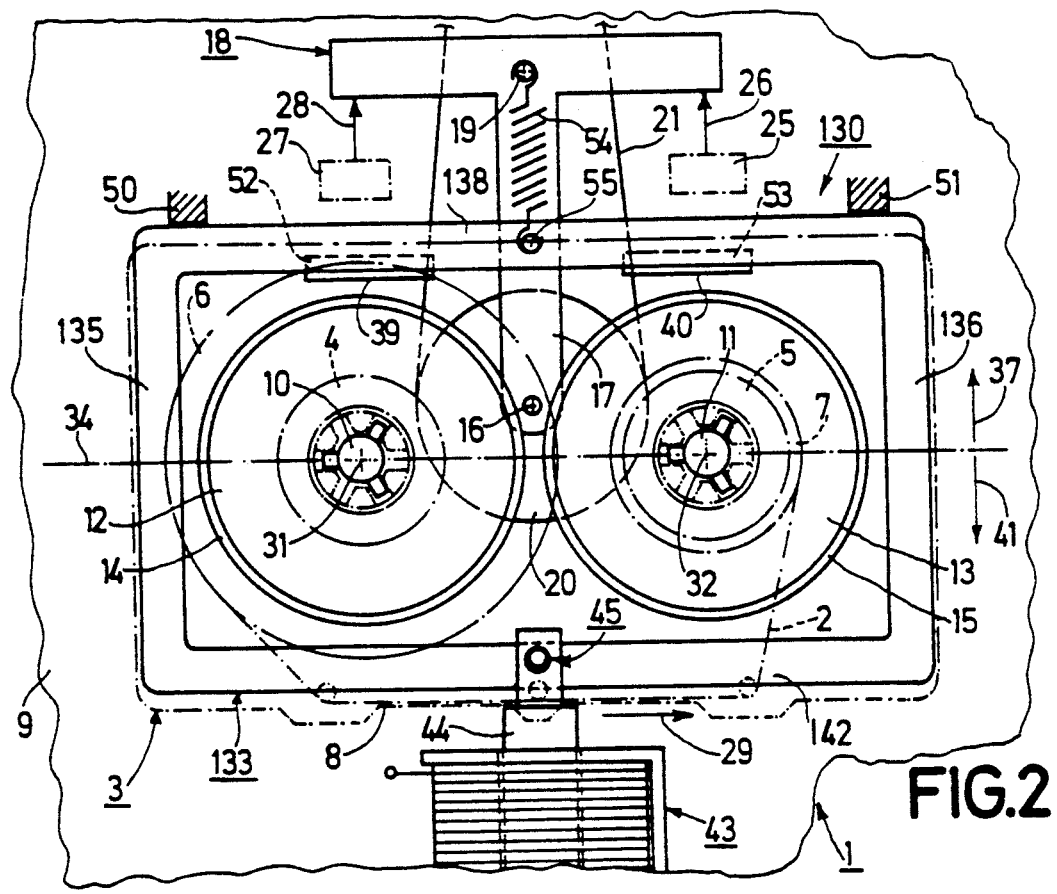
FIG. 2 shows, in a manner similar to FIG. 1, a recording reproducing apparatus in accordance with a second illustrative embodiment, in which a braking device for two drive wheels, each connected to a winding spindle, has a frame-shaped carrier which has two carrier portions which pass through the plane through the axes of the two drive wheels and are arranged so as to run along those regions of the peripheral sides of the two drive wheels which face away from one another.

In the recording and reproducing apparatus 1 represented in FIG. 2, the frame-shaped carrier 133 of the braking device 130 is of rectangular design and the two carrier portions 135 and 136 passing through the plane 34 through the axes 31 and 32 of the two friction wheels 12 and 13, and the two webs 138 and 142 connecting the carrier portions 135 and 136 to one another lie essentially on the same level as the two friction wheels 12 and 13. In this arrangement, the carrier portions 135 and 136 are arranged so as to run laterally along those regions of the peripheral sides of the two friction wheels 12 and 13 which face away from one another. Such a design and arrangement of the carrier 133 of the braking device 130 brings the advantage that, in the axial direction of the friction wheels, the carrier requires absolutely no additional space in relation to the friction wheels. In the present apparatus according to FIG. 2, the braking surfaces 39 and 40 of the braking device 130 are formed by the boundary surfaces of two rubber brake shoes 52 and 53 connected to the web 138. In the present case, a tension spring 54 hooked on to the bearing shaft 19 of the bearing bracket 18 on the one hand and on to a pin 55 projecting from the web 138 on the other hand is provided as return spring for the carrier 33 of the braking device 130.

Figure 3:
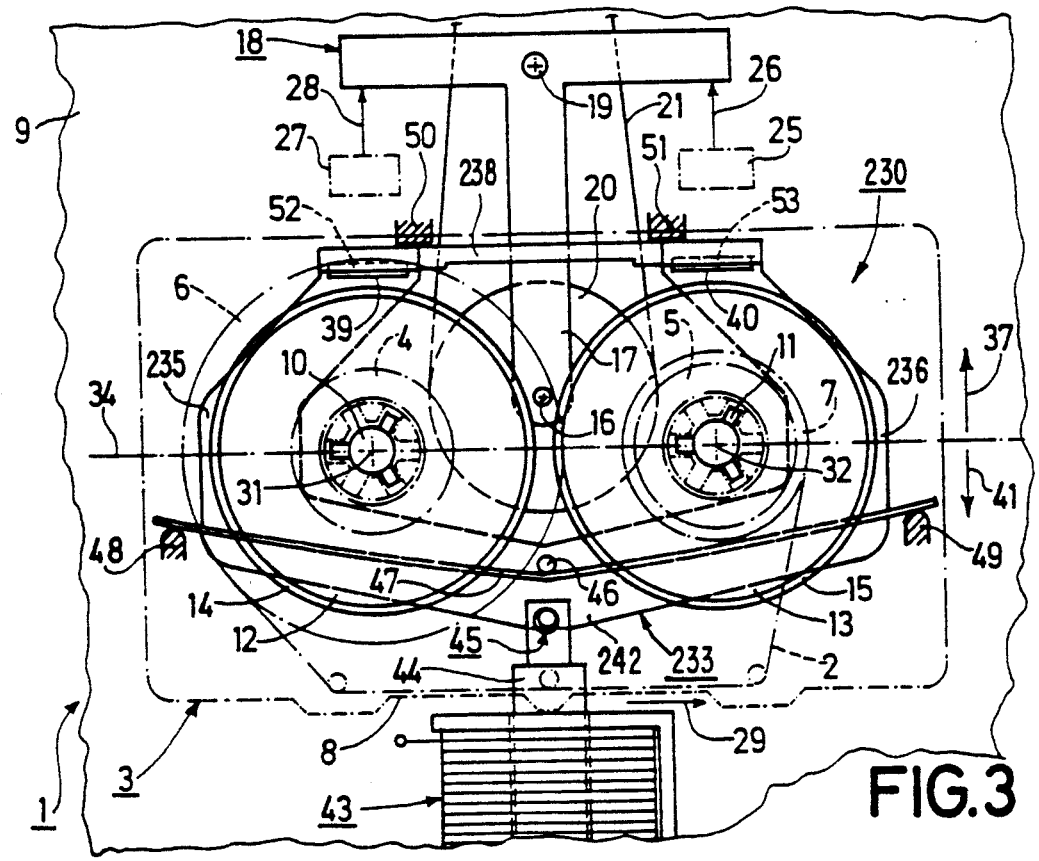

In the recording and reproducing apparatus represented in FIG. 3, the frame-shaped carrier 233 of the braking device 230 is arranged in such a way relative to the friction wheels 12 and 13 that its carrier portions 235 and 236, which pass through the plane 34 through the axes 31 and 32 of the two friction wheels 12 and 13, are arranged so as to run laterally along those front sides of the friction wheels which face away from the winding spindles 10 and 11. In the apparatus according to FIG. 3, the carrier 33 of the braking device 30 lies essentially below the two friction wheels 12 and 13, it thereby being possible to arrange the friction wheels closely adjacent to that principal wall of the cassette 3 which faces them and to make the winding spindles 10 and 11 correspondingly short. As in the case of the apparatus according to FIG. 2, in the apparatus according to FIG. 3 the braking surfaces 39 and 40 of the braking device 30 are formed by the boundary surfaces of two rubber brake shoes 52 and 53 connected to the bent web 38 of the carrier 33.

Due to the frame-shaped design of the carrier 233 of the braking device 230, it is advantageously possible in the case of the apparatuses according to FIGS. 2 and 3 for a drive shaft 16 for driving both of the friction wheels to be arranged in the region between the two friction wheels 12 and 13 and for the diameter of the two friction wheels 12 and 13 to be chosen to be as large as possible.

The arrangement of the drive shaft 16 between the two friction wheels 12 and 13, as is the case with the apparatuses according to the three illustrative embodiments described above, is of advantage particularly when the apparatuses described above are so-called autoreverse apparatuses, in which although the two hubs 4 and 5 are to be driven in opposite directions of rotation, they are otherwise to be driven in the same way via the friction wheels 12 and 13 in order to be able to drive the magnetic tape 2 in the same way in opposite tape running directions for recording and reproducing.

The invention is not limited to the illustrative embodiments described above. For example, a frame-shaped carrier of a braking device can also be of oval-shaped construction. Instead of a solenoid plunger magnet, a magnet of a different design or a mechanical displacement device can also be provided as displacement device for a frame-shaped carrier of a braking device. Instead of a drive shaft for driving the drive wheels connected to the winding spindles, a friction drive wheel or even a toothed drive wheel can also be provided, in the latter case the drive wheels connected to the winding spindles being designed as toothed wheels which at the same time have cylindrical projections, coaxial to the latter, with which the braking surfaces provided on the frame-shaped carrier of a braking device interact.

I claim:

1. A recording and/or reproducing apparatus for a record carrier in tape form which extends between two rotatable drivable hubs, said apparatus having two winding spindles connected to two adjacent drive wheels rotatable about two axes, separated by a predetermined space, wherein the improvement comprises:
   a closed one piece braking frame which is displaceable substantially perpendicularly to a plane including the axes of the drive wheels, the frame having two carrier portions passing through said plane and outside the predetermined space between the drive wheels axes, one carrier portion being located on each side of said predetermined space, said two carrier portions being joined together by two joining members, said two joining members and said two carrier portions defining a closed, continuous perimeter of said braking frame;

two braking surfaces on one of the joining members of the frame on a first side of said plane for interacting with said drive wheels; and displacement means engaging the other of the joining members of the frame on a second side of said plane for displacing the frame and causing the braking surfaces to interact simultaneously with the two drive wheels.

2. A recording and/or reproducing apparatus in accordance with claim 1, wherein a leaf spring provides opposing force for opposing the displacing of the frame by the displacement means.

3. A recording and/or reproducing apparatus in accordance with claim 2, in which the joining member on the first side of the plane carrying the two braking surfaces is formed with a bend.

4. A recording and/or reproducing apparatus in accordance with claim 1, in which a coil spring provides and opposing force for opposing the displacing of the frame by the displacement means.

5. A tape cassette apparatus for a tape cassette having a magnetic tape wound on a pair of rotatably drivable hubs, said apparatus comprising:

a) two winding spindles for driving the hubs of a tape cassette loaded in said apparatus, said winding spindles being rotatable about two respective axes separated by a predetermined space;

b) a drive wheel coaxial with and fixed to each winding spindle;

c) a braking frame displaceable substantially perpendicularly to a plane including said axes of said drive wheels, said frame having two carrier portions passing through said plane outside of said predetermined space between said axes of said winding spindles, one carrier portion being located on each side of said predetermined space, and two joining portions rigidly joining said carrier portions together, said two carrier portions and two joining portions defining a closed braking frame have a closed, continuous perimeter;

d) drive means, including a rotatable drive element located within said predetermined space and within said closed braking frame and alternately engageable with each of said drive wheels, for selectively rotating said drive wheels;

e) two braking surfaces on one of said joining portions of said frame for contacting said drive wheels; and f) displacement means engaging said frame for selectively displacing said frame and causing said braking surfaces to contact and brake said drive wheels.

6. A tape cassette apparatus according to claim 5, wherein said carrier portions of said braking frame are coplanar with said drive wheels and extend adjacent the peripheral sides of said drive wheels which face away from each other.

7. A tape cassette apparatus according to claim 6, wherein said braking frame is planar.

8. A tape cassette apparatus according to claim 7, wherein said braking frame is an integral one-piece frame.

9. A tape cassette apparatus according to claim 6, wherein said braking frame is an integral one-piece frame.

10. A tape cassette apparatus according to claim 9, wherein said winding spindles terminate at respective ends opposite said drive wheels, said carrier portions of said braking frame are positioned axially with respect to said winding spindles between said ends of said winding spindles and said drive wheels, said drive wheels having an outer perimeter which defines an oval area, when viewed in the axial direction of said winding spindles, which includes the area of said drive wheels and the area between said drive wheels, and said frame is located substantially within said oval area; and said drive means includes a swivellable arm on which said drive element is rotatable, said arm extending adjacent the sides of said drive wheels opposite said winding spindles and said frame.

11. A tape cassette apparatus according to claim 10, wherein said braking frame is planar.

12. A tape cassette apparatus according to claim 11, wherein said braking frame is an integral one-piece frame.

13. A tape cassette apparatus according to claim 5, wherein said winding spindles terminate at respective ends opposite said drive wheels, said carrier portions of said braking frame are positioned axially with respect to said winding spindles adjacent the major sides of said driving wheels facing away from said ends of said winding spindles, said drive wheels define an oval area, when viewed in the axial direction of said winding spindles, which include the area of said driving wheels and the area between said driving wheels, and said frame is located substantially within said oval area.

14. A tape cassette apparatus according to claim 13, wherein said braking frame is planar.

15. A tape cassette apparatus according to claim 5, wherein said drive element is a drive shaft.

16. A tape cassette apparatus according to claim 5, wherein said displacement means comprises a solenoid plunger magnet.

* * * * *